(12) United States Patent
Kawashima (10) Patent No.: US 12,427,918 B2
(45) Date of Patent: Sep. 30, 2025

(54) SOUND CONTROL DEVICE, STORAGE MEDIUM STORING COMPUTER PROGRAM FOR SOUND CONTROL, AND SOUND CONTROL METHOD

(71) Applicant: TOYOTA JIDOSHA KABUSHIKI KAISHA, Toyota (JP)

(72) Inventor: Wataru Kawashima, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 16 days.

(21) Appl. No.: 18/631,732

(22) Filed: Apr. 10, 2024

(65) Prior Publication Data

US 2024/0359622 A1 Oct. 31, 2024

(30) Foreign Application Priority Data

Apr. 28, 2023 (JP) ................. 2023-074759

(51) Int. Cl.
*G08B 21/00* (2006.01)
*B60Q 5/00* (2006.01)
*B60W 50/14* (2020.01)

(52) U.S. Cl.
CPC ............ *B60Q 5/005* (2013.01); *B60W 50/14* (2013.01); *B60Q 2800/10* (2022.05); *B60W 2050/143* (2013.01)

(58) Field of Classification Search
USPC .. 340/425.5, 995.13, 995.17, 992, 952, 943, 340/979, 539.22, 588, 691.3, 692, 825.24
See application file for complete search history.

(56) References Cited

U.S. PATENT DOCUMENTS

| | | | |
|---|---|---|---|
| 9,453,405 B2* | 9/2016 | Reid | ................. E21B 47/01 |
| 2017/0327004 A1* | 11/2017 | Mochizuki | ............ B60W 10/08 |
| 2018/0299889 A1 | 10/2018 | Yokota | |
| 2023/0303052 A1* | 9/2023 | Gesang | ................. B60L 58/20 |
| 2024/0236612 A1* | 7/2024 | Kaetel | ................. H04R 5/04 |

FOREIGN PATENT DOCUMENTS

| | | |
|---|---|---|
| JP | 2018-177064 A | 11/2018 |
| JP | 2019-128490 A | 8/2019 |
| JP | 2019-167116 A | 10/2019 |

* cited by examiner

*Primary Examiner* — Daniel Previl
(74) *Attorney, Agent, or Firm* — Dinsmore & Shohl LLP (57) ABSTRACT

A sound control device has a processor configured to determine whether a driving mode of a vehicle is a first driving mode wherein degree to which the driver participates in driving is low or a second driving mode wherein the degree to which the driver participates in driving is higher, and decide to cause attenuation of predetermined sounds inside the vehicle in a first attenuation mode, using a sound control unit which generates a suppression sound signal for output of suppression sound to cause attenuation of the predetermined sounds, when the driving mode of the vehicle is the first driving mode, or decide to cause attenuation of the predetermined sound inside the vehicle in a second attenuation mode which has a smaller degree of attenuation than the first attenuation mode, when the driving mode of the vehicle is the second driving mode.

5 Claims, 4 Drawing Sheets

SOUND CONTROL DEVICE, STORAGE MEDIUM STORING COMPUTER PROGRAM FOR SOUND CONTROL, AND SOUND CONTROL METHOD

CROSS-REFERENCE TO RELATED APPLICATIONS

This application claims priority to Japanese Patent Application No. 2023-074759 filed Apr. 28, 2023, the entire contents of which are herein incorporated by reference.

FIELD

The present disclosure relates to a sound control device, a storage medium storing a computer program for sound control, and a sound control method.

BACKGROUND

An automatic control system in a vehicle has, for example, a self-driving mode in which the vehicle is driven primarily by the automatic control system and manual driving mode in which the vehicle is driven primarily by the driver. In self-driving mode, some or all of the driving operations necessary for traveling of the vehicle are executed automatically, thus lowering the degree to which the driver participates in driving. In manual driving mode, the types of driving operations executed automatically are less than in self-driving mode, or zero, and therefore the degree to which the driver participates in driving is high.

In order to increase the level of quietness inside the vehicle, it is common to use an active sound control device that reduces noise inside the vehicle (see Japanese Unexamined Patent Publication No. 2019-128490, for example). In Japanese Unexamined Patent Publication No. 2019-128490, however, noises that are from emergency vehicle such as siren sounds or alarm sounds of other vehicles are not reduced, so that the driver can hear such sounds.

SUMMARY

When the degree to which the driver participates in driving is high, emergency vehicle siren sounds or alarm sounds of other vehicles form part of the surrounding environment of the vehicle and should therefore be heard by the driver who is driving the vehicle.

When the degree to which the driver participates in driving is low, on the other hand, it may be that quietness inside the vehicle is a priority in order to increase driver comfort.

It is an object of the present disclosure to provide a sound control device that reduces external sound inside the vehicle to greater extent when the degree to which the driver participates in driving of the vehicle is low, compared to when the degree to which the driver participates in driving of the vehicle is high.

(1) One embodiment of the present disclosure provides a sound control device. The sound control device has a processor configured to determine whether a driving mode of a vehicle is a first driving mode wherein degree to which the driver participates in driving is low or a second driving mode wherein the degree to which the driver participates in driving is higher than the first driving mode, and decide to cause attenuation of predetermined sounds inside the vehicle in a first attenuation mode, using a sound control unit which generates a suppression sound signal for output of suppression sound to cause attenuation of the predetermined sound including sounds that has intruded into the vehicle from outside the vehicle, when it has been determined that the driving mode of the vehicle is the first driving mode, or to decide to cause attenuation of the predetermined sound inside the vehicle in a second attenuation mode which has a smaller degree of attenuation than the first attenuation mode, using the sound control unit, when it has been determined that the driving mode of the vehicle is the second driving mode.

(2) In the sound control device of (1) above, that the processor is further configured to determine whether or not sounds outside the vehicle include the predetermined sounds that should be heard while the driver is driving the vehicle, and decide to further reduce the degree of attenuation in the second attenuation mode to below that in the first attenuation mode, when it has been determined that the driving mode of the vehicle is the second driving mode and it has been determined that the sounds outside the vehicle include the predetermined sounds.

(3) In the sound control device of (1) or (2) above, the predetermined sounds have emergency vehicle siren sounds, horn sounds of other vehicle or railroad crossing alarm sounds.

(4) According to another embodiment, a storage medium storing a computer program for sound control is provided. The computer program for sound control causes a processor to execute a process, and the process includes determining whether a driving mode of a vehicle is a first driving mode wherein degree to which the driver participates in driving is low or a second driving mode wherein the degree to which the driver participates in driving is higher than the first driving mode, and deciding to cause attenuation of predetermined sounds inside the vehicle in a first attenuation mode, using a sound control unit which generates a suppression sound signal for output of suppression sound to cause attenuation of the predetermined sounds including sounds that has intruded into the vehicle from outside the vehicle, when it has been determined that the driving mode of the vehicle is the first driving mode, or deciding to cause attenuation of the predetermined sound inside the vehicle in a second attenuation mode which has a smaller degree of attenuation than the first attenuation mode, when it has been determined that the driving mode of the vehicle is the second driving mode.

(5) Another embodiment of the present disclosure provides a sound control method. The sound control method is carried out by a sound control device and the method includes determining whether a driving mode of a vehicle is a first driving mode wherein degree to which the driver participates in driving is low or a second driving mode wherein the degree to which the driver participates in driving is higher than the first driving mode, and deciding to cause attenuation of predetermined sounds inside the vehicle in a first attenuation mode, using a sound control unit which generates a suppression sound signal for output of suppression sound to cause attenuation of the predetermined sounds including sounds that has intruded into the vehicle from outside the vehicle, when it has been determined that the driving mode of the vehicle is the first driving mode, or deciding to cause attenuation of the predetermined sound inside the vehicle in a second attenuation mode which has a smaller degree of attenuation than the first attenuation mode, when it has been determined that the driving mode of the vehicle is the second driving mode.

The sound control device of the present disclosure can reduce external sound inside the vehicle when the degree to which the driver participates in driving of the vehicle is low, compared to when the degree to which the driver participates in driving of the vehicle is high, thereby increasing quietness inside the vehicle cabin while also helping the driver to be aware of the surrounding environment of the vehicle when the degree to which the driver participates in driving of the vehicle is high.

The object and advantages of the present disclosure will be realized and attained by the elements and combinations particularly indicated in the claims. It is to be understood that both the foregoing general description and the following detailed description are exemplary and explanatory and are not restrictive of the present disclosure as claimed.

DESCRIPTION OF EMBODIMENTS

Figure 1:
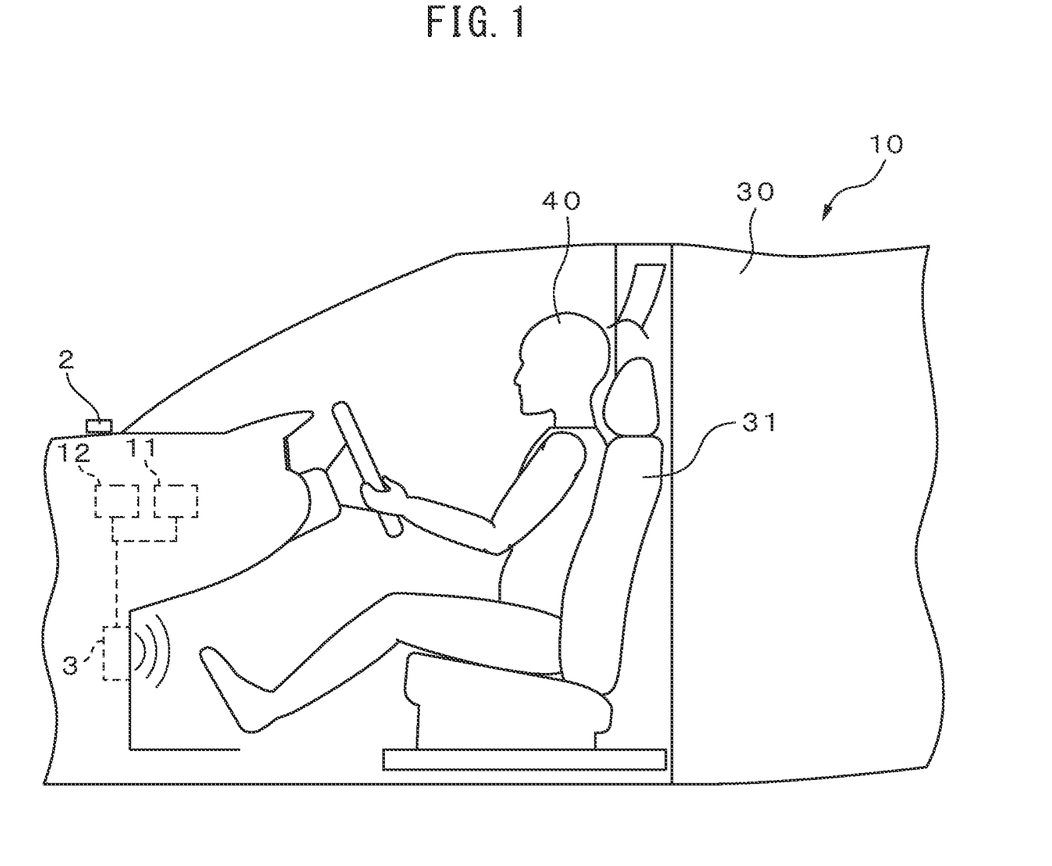
FIG. 1 is a diagram illustrating operation of a sound control device of the embodiment in overview.

FIG. 1 is a diagram illustrating operation of a sound control device 12 of the embodiment in overview. Operation relating to sound control processing by the sound control device 12 disclosed herein will now be described in overview with reference to FIG. 1.

The vehicle 10 has a microphone 2, a speaker 3, an automatic control device 11 and a sound control device 12. The automatic control device 11 controls operation of the vehicle 10 according to two driving modes with different degrees of participation of the driver 40 in driving. The vehicle 10 may also be a self-driving vehicle.

For example, the automatic control device 11 has a self-driving mode wherein the degree to which the driver 40 participates in driving is low (for example, driving mode with levels 3 to 5) and a manual driving mode wherein the degree to which the driver 40 participates in driving is high (for example, driving mode with levels 0 to 2). The self-driving mode is an example of the first driving mode. The manual driving mode is an example of the second driving mode.

The driver 40 sits in the driving seat 31 in the cabin 30 and operates the vehicle 10 in a driving mode. In self-driving mode, the vehicle 10 is driven primarily by the automatic control device 11. In manual driving mode, the vehicle 10 is driven primarily by the driver 40.

Emergency vehicle siren sounds, horn sounds of other vehicles and railroad crossing alarm sounds can be heard outside of the vehicle 10. Since sounds outside of the vehicle 10 (hereunder also referred to as "external sounds") intrude into the cabin 30, external sounds are included among the sound in the cabin 30. The driver 40 may perceive such external sounds as noise.

The sound control device 12 inputs external sounds using the microphone 2. The sound control device 12 generates a suppression sound signal for output of a suppression sound which causes attenuation of the external sounds in the cabin 30, and outputs the suppression sound signal to the speaker 3. The speaker 3 outputs the suppression sound which causes attenuation of the external sounds in the cabin 30. This improves attenuates external sounds in cabin 30, thus improving quietness in the cabin 30.

When the driving mode of the vehicle is self-driving mode, the sound control device 12 decides to cause attenuation of external sounds in the cabin 30 in the first attenuation mode. For example, external sounds in the cabin 30 are reduced to about 10% to 50% in the first attenuation mode.

Since in self-driving mode the vehicle 10 is driven primarily by the automatic control device 11, the driver 40 can reside in a more silent cabin 30.

When the driving mode of the vehicle 10 is manual driving mode, the sound control device 12 decides to cause attenuation of external sounds in the cabin 30 in the second attenuation mode. The degree of attenuation of external sounds in the second attenuation mode is lower than in the first attenuation mode. For example, in the second attenuation mode the degree of reduction by which the magnitude of external sounds in the cabin 30 is reduced is no greater than half of that in the first attenuation mode.

Since in manual driving mode the vehicle 10 is driven primarily by the driver 40, external sounds are allowed to be heard so that the driver can be aware of the surrounding environment of the vehicle.

As explained above, the sound control device 12 of the embodiment increases quietness in the cabin 30 by more reduction of external sounds in the cabin 30 when the degree to which the driver 40 participates in driving of the vehicle 10 is low, compared to when the degree to which the driver 40 participates in driving of the vehicle 10 is high. This allows the driver 40 to ride in the vehicle 10 more comfortably. The sound control device 12 of the embodiment can also help the driver be aware of the surrounding environment of the vehicle when the degree to which the driver 40 participates in driving of the vehicle is high.

Figure 2:
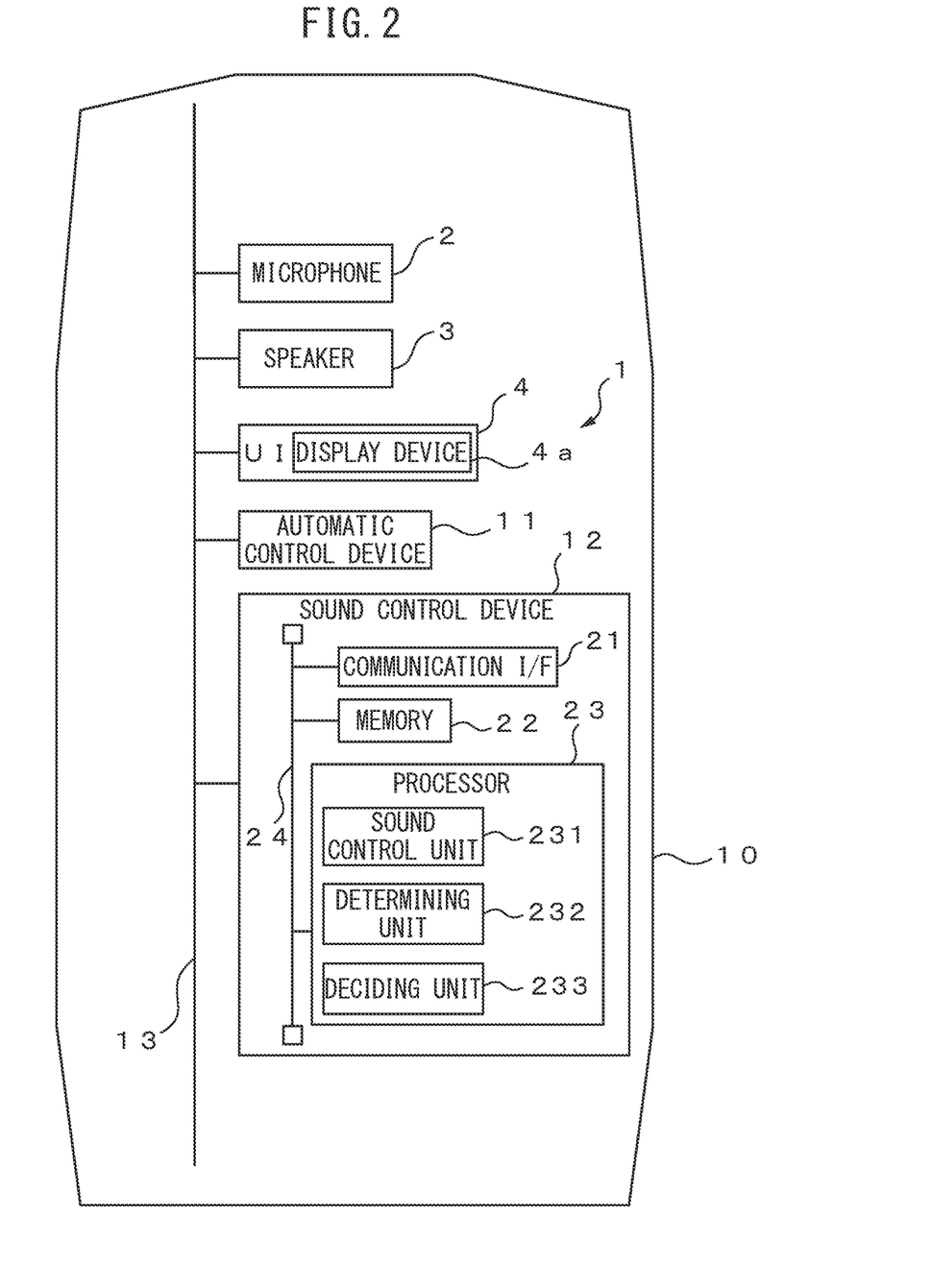
FIG. 2 is a general schematic drawing of a vehicle in which a sound control system is mounted that comprises a sound control device of the embodiment.

FIG. 2 is a general schematic drawing of a vehicle 10 in which a sound control system 1 is mounted that comprises the sound control device 12 of the embodiment. The vehicle 10 has a microphone 2, a speaker 3, a user interface (UI) 4, an automatic control device 11 and a sound control device 12. The sound control system 1 includes at least the microphone 2, the speaker 3 and the sound control device 12.

The microphone 2, speaker 3, UI 4, automatic control device 11 and sound control device 12 are connected communicably via an in-vehicle network 13 conforming to the Controller Area Network standard.

The microphone 2 is an example of a sound input device. The microphone 2 is installed on the outer side of the vehicle 10, for example, allowing input of sounds from outside of the vehicle 10. The microphone 2 also inputs sounds generated by the driving unit (not shown) of the vehicle 10, and running sounds produced by traveling of the vehicle 10. The microphone 2 converts the input sound into a sound electrical signal and outputs the sound electrical signal to the sound control device 12 via the in-vehicle network 13. Only one microphone 2 is shown in the example shown in FIG. 2, but a plurality of microphones may also be mounted in the vehicle 10.

The speaker 3 is an example of a sound output device. The speaker 3 inputs suppression sound signals from the sound control device 12 via the in-vehicle network 13 and amplifies the suppression sound signal, outputting the suppression sounds. Only one speaker 3 is shown in the example shown in FIG. 2, but a plurality of speakers may also be mounted in the vehicle 10.

The UI 4 is an example of the notification unit. The UI 4, controlled by the automatic control device 11 and sound control device 12, notifies the driver 40 of operating information relating to the vehicle 10. The operating information relating to the vehicle 10 includes traveling information for the vehicle 10. The UI 4 has a display device 4a such as a liquid crystal display or touch panel, for display of the operating information. The UI 4 may also have an acoustic output device (not shown) to notify the driver 40 of operating information. The UI 4 also creates an operation signal in response to operation of the vehicle 10 by the driver 40. The operation information may be, for example, a destination location, transit points, vehicle speed, or a request for transfer of driving mode. The UI 4 also has a touch panel or operating button, for example, as an input device for inputting operation information from the driver 40 to the vehicle 10. The UI 4 outputs the input operation information to the automatic control device 11 and sound control device 12 via the in-vehicle network 13.

The automatic control device 11 controls operation including traveling of the vehicle 10. The automatic control device 11 has two driving modes with different degrees of participation of the driver 40 for driving. The automatic control device 11 controls the operation of the vehicle 10 according to the driving mode.

For example, the automatic control device 11 has a self-driving mode wherein the degree to which the driver 40 participates in driving is low (for example, driving mode with levels 3 to 5) and a manual driving mode wherein the degree to which the driver 40 participates in driving is high (for example, driving mode with levels 0 to 2). In self-driving mode, the vehicle 10 is driven primarily by the automatic control device 11. In manual driving mode, the vehicle 10 is driven primarily by the driver 40.

The automatic control device 11 outputs mode information representing the current driving mode to the sound control device 12, via the in-vehicle network 13.

In the driving mode wherein the degree to which the driver 40 participates in driving is low, all or some of the driving operations necessary for traveling of the vehicle 10 are executed automatically, while in the driving mode wherein the degree to which the driver 40 participates in driving is high, the types of driving operations executed automatically are less than in the driving mode wherein the degree to which the driver 40 participates in driving is low, or are zero.

In self-driving mode, the automatic control device 11 generates a driving plan to control actions such as steering, engine actuation and braking based on map information and on detection information from sensors (not shown) mounted in the vehicle 10. The automatic control device 11 outputs the automatic control signal based on the driving plan, to an actuator (not shown) that controls the steering wheel, a drive unit (not shown), or the brake (not shown), via the in-vehicle network 13.

In manual driving mode, the automatic control device 11 generates a manual control signal to control operation of the vehicle 10 such as steering, actuation and braking based on operation by the driver 40, and outputs the manual control signal to an actuator for actuation of the steering wheel, and to a drive unit or brake, via the in-vehicle network 13.

The automatic control device 11 can drive the vehicle 10 in self-driving mode in regions where self-driving mode is permitted (for example, regions where a high-precision map has been prepared for control of the vehicle 10). In regions where self-driving mode is not permitted, the automatic control device 11 controls the vehicle 10 in manual driving mode. In response to a request by the driver 40, the automatic control device 11 switches from self-driving mode to manual driving mode or from manual driving mode to self-driving mode. The automatic control device 11 also switches from self-driving mode to manual driving mode when it has determined that the vehicle 10 cannot be safely driven in self-driving mode.

The sound control device 12 carries out sound control processing, determination processing and decision processing. For this purpose, the sound control device 12 has a communication interface (IF) 21, a memory 22 and a processor 23. The communication IF 21, the memory 22 and the processor 23 are connected via a signal wire 24. The communication IF 21 has an interface circuit to connect the sound control device 12 with the in-vehicle network 13.

The memory 22 is an example of a memory unit, and it has a volatile semiconductor memory and a non-volatile semiconductor memory, for example. The memory 22 stores an application computer program and various data to be used for information processing carried out by the processor 23 of each device.

All or some of the functions of the sound control device 12 are functional modules driven by a computer program operating on the processor 23, for example. The processor 23 has a sound control unit 231, a determining unit 232 and a deciding unit 233. Alternatively, the functional module of the processor 23 may be a specialized computing circuit in the processor 23. The processor 23 comprises one or more CPUs (Central Processing Units) and their peripheral circuits. The processor 23 may also have other computing circuits such as a logical operation unit, numerical calculation unit or graphics processing unit.

The sound control unit 231 generates a suppression sound signal to cause attenuation of predetermined sounds in the cabin 30, based on a sound electrical signal representing input sound that has been input through the microphone 2. The sound control unit 231 outputs the suppression sound signal to the speaker 3. The degree of attenuation for causing attenuation of predetermined sounds in the cabin 30 is decided based on attenuation degree information relayed from the deciding unit 233. The microphone 2 inputs sounds from outside the vehicle 10 (external sounds). The microphone 2 also inputs driving sounds generated by the driving unit of the vehicle 10, and running sounds produced by traveling of the vehicle 10. The external sounds, driving sounds and running sounds intrude into the cabin 30. These external sounds, driving sounds and running sounds will also be referred to herein as "intrusive sounds".

The sound control unit 231 generates a suppression sound signal to cause attenuation of intrusive sounds in the cabin 30. The suppression sound signal includes signals that are in antiphase with the intrusive sounds. The degree of attenuation for causing attenuation of the intrusive sounds is controlled by the amplitude of the signal. The intrusive sounds are an example of predetermined sounds including sounds that intrude into the cabin 30 from outside of the vehicle 10. Other operation by the sound control device 12 will be described in detail below.

The automatic control device 11 and sound control device 12 are electronic control units (ECU), for example. In the case of FIG. 2, the automatic control device 11 and the sound control device 12 are described as separate devices, but they may also be formed as a single device.

Figure 3:
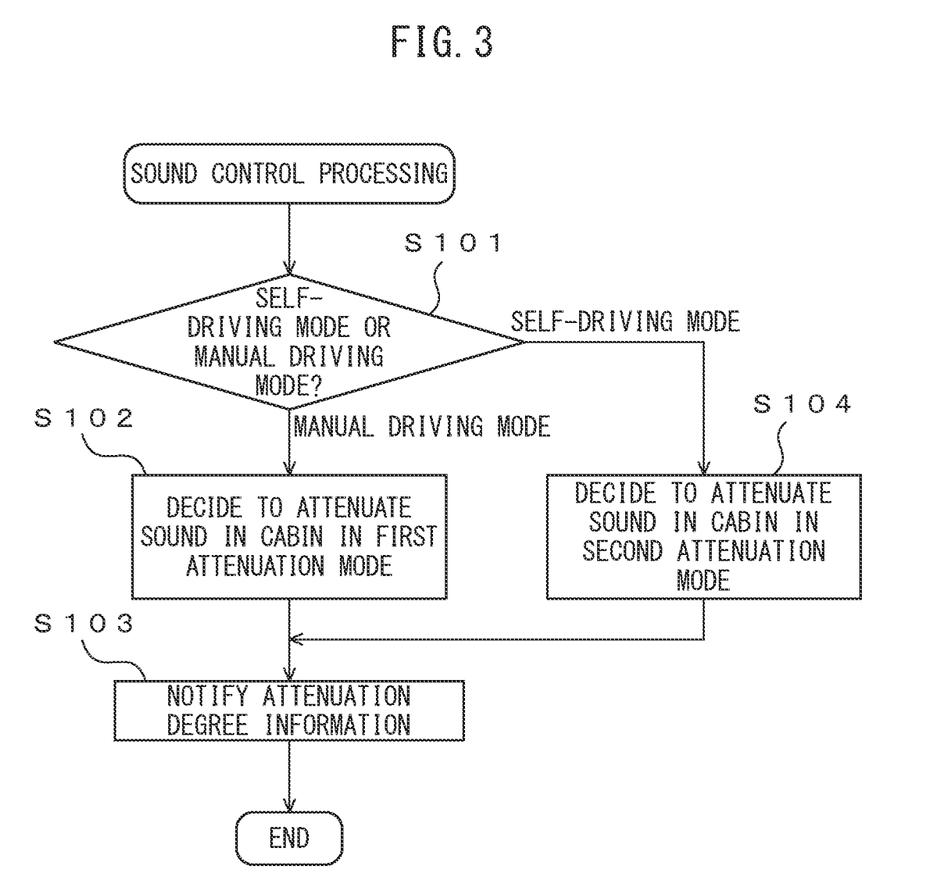
FIG. 3 is an example of an operation flow chart for sound control processing by the sound control device of the embodiment.

FIG. 3 is an example of an operation flow chart for sound control processing by the sound control device 12 of the embodiment. Sound control processing by the sound control device 12 will be described below with reference to FIG. 3.

The sound control device 12 carries out sound control processing according to the operation flow chart shown in FIG. 3, at a sound control time having a predetermined cycle.

First, the determining unit 232 determines either that the driving mode of the vehicle 10 is self-driving mode wherein the degree to which the driver 40 participates in driving is low, or manual driving mode wherein the degree to which the driver 40 participates in driving is higher than in self-driving mode (step S101). When the mode information indicates self-driving mode, the determining unit 232 determines that the driving mode of the vehicle 10 is self-driving mode. When the mode information indicates manual driving mode, the determining unit 232 determines that the driving mode of the vehicle 10 is manual driving mode. The determining unit 232 is an example of the first determining unit.

When the driving mode of the vehicle 10 is self-driving mode (step S101—self-driving mode), the deciding unit 233 decides to cause attenuation of intrusive sounds in the cabin 30 in the first attenuation mode by using the sound control unit 231 (step S102). The deciding unit 233 generates attenuation degree information representing the degree of attenuation for causing attenuation of the magnitude of intrusive sounds in the cabin 30 in the first attenuation mode, and notifies the sound control unit 231 of the attenuation degree information. For example, in first attenuation mode, the deciding unit 233 generates attenuation degree information so that intrusive sounds in the cabin 30 are attenuated to a magnitude of 10% to 50%.

The deciding unit 233 then notifies the sound control unit 231 of the attenuation degree information (step S103), and the series of processing steps is complete.

The sound control unit 231 generates a suppression sound signal to cause attenuation of intrusive sounds in the cabin 30 based on a sound electrical signal input through the microphone 2, and the attenuation degree information. The relationship between the magnitude of the suppression sound signal and the degree of attenuation for attenuation of intrusive sounds in the cabin 30 is stored in the memory 22. The sound control unit 231 refers to this relationship and generates the suppression sound signal for the degree of attenuation represented by the attenuation degree information. The sound control unit 231 generates the suppression sound signal based on the current attenuation degree information until new attenuation degree information is relayed from the deciding unit 233.

Based on the suppression sound signal, the speaker 3 then outputs the suppression sound which causes attenuation of the external sounds in the cabin 30. Since the magnitude of external sounds in the cabin 30 is attenuated to 10% to 50% in the first attenuation mode, quietness inside the cabin 30 is improved. The driver 40 can thus reside more comfortably in the cabin 30.

When the driving mode of the vehicle 10 is manual driving mode (step S101—manual driving mode), on the other hand, the deciding unit 233 decides to cause attenuation of intrusive sounds in the cabin 30 in the second attenuation mode by using the sound control unit 231 (step S104). The deciding unit 233 generates attenuation degree information representing the degree of attenuation for causing attenuation of the magnitude of intrusive sounds in the cabin 30 in the second attenuation mode, and notifies the sound control unit 231 of the attenuation degree information.

The degree of attenuation of intrusive sounds in the second attenuation mode is lower than in the first attenuation mode. For example, in the second attenuation mode the degree of attenuation for the magnitude of intrusive sounds in the cabin 30 is no greater than half of that in the first attenuation mode. Specifically, in second attenuation mode, the deciding unit 233 generates attenuation degree information so that intrusive sounds in the cabin 30 are attenuated to a magnitude of 50% to 90%. In the second attenuation mode, the deciding unit 233 may also prevent attenuation of intrusive sounds in the cabin 30.

The deciding unit 233 then notifies the sound control unit 231 of the attenuation degree information (step S103), and the series of processing steps is complete.

The sound control unit 231 generates a suppression sound signal to cause attenuation of intrusive sounds in the cabin 30 based on a sound electrical signal input through the microphone 2, and the attenuation degree information.

Based on the suppression sound signal, the speaker 3 then outputs the suppression sound which causes attenuation of the intrusive sounds in the cabin 30. Since intrusive sounds in the cabin 30 are attenuated to a magnitude of 50% to 90% in the second attenuation mode, the driver 40 is allowed to hear external sounds, so as to be made aware of the surrounding environment of the vehicle 10. In manual driving mode, the driver 40 drives the vehicle 10 while hearing the sounds outside of the vehicle 10.

As explained above, the sound control device of the embodiment increases quietness in the cabin by greater reduction of intrusive sounds in the cabin when the degree to which the driver participates in driving of the vehicle is low, compared to when the degree to which the driver participates in driving of the vehicle is high. This allows the driver to ride in the vehicle more comfortably. The sound control device of the embodiment can also help the driver be aware of the surrounding environment of the vehicle by increasing the level of intrusive sounds in the cabin when the degree to which the driver participates in driving of the vehicle is high.

Figure 4:
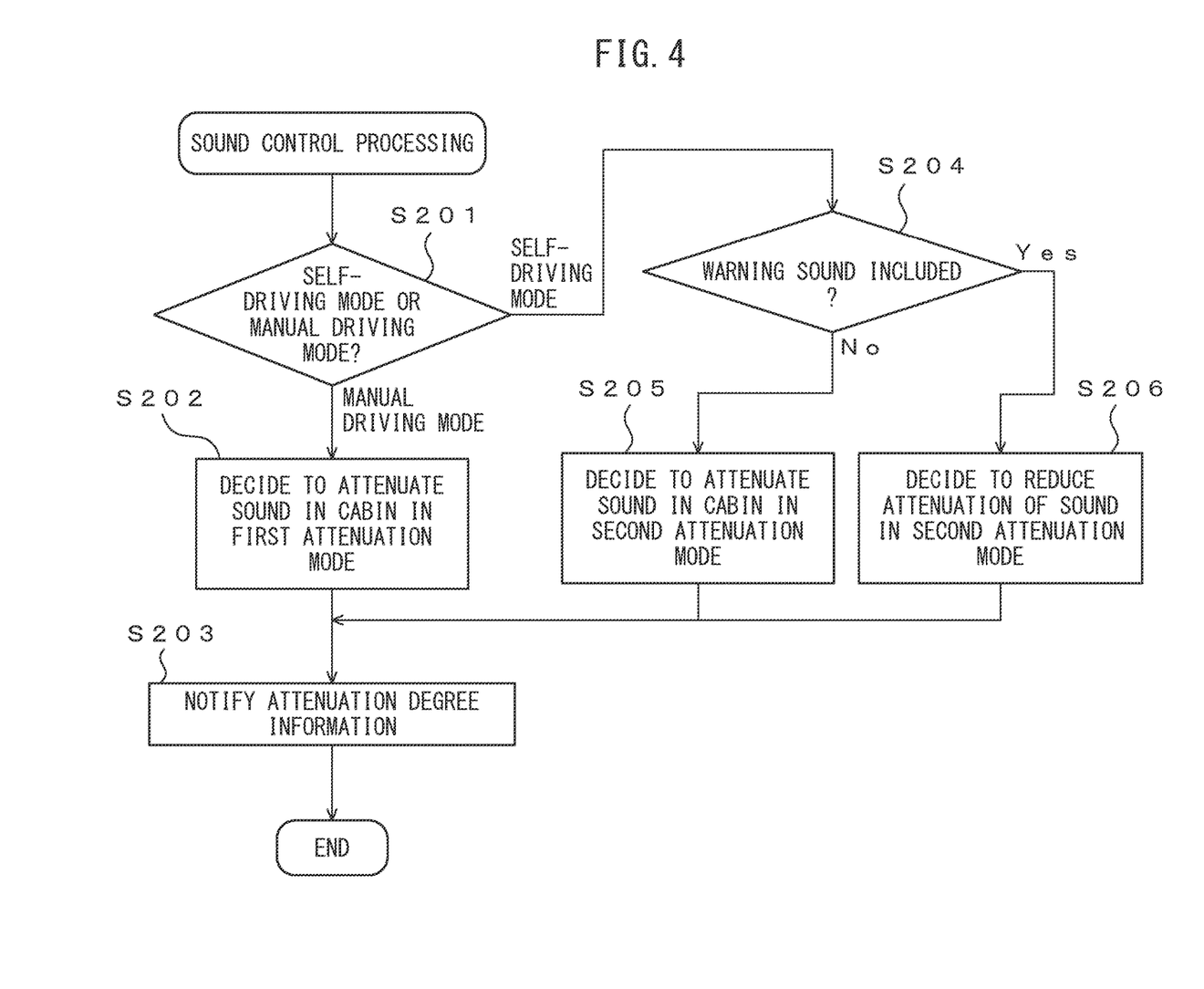
FIG. 4 is an example of another operation flow chart for sound control processing by the sound control device of the embodiment.

Another operation example of the sound control device 12 of the embodiment will now be described with reference to FIG. 4. FIG. 4 is another example of an operation flow chart for sound control processing by the sound control device 12 of the embodiment. The sound control device 12 carries out sound control processing according to the operation flow chart shown in FIG. 4, at a sound control time having a predetermined cycle.

The operation flow chart shown in FIG. 4 also has additional steps S204 and S206. Processing in steps S201 to S203 and S205 is the same as steps S101 to S104 described above.

When the driving mode of the vehicle 10 is manual driving mode (step S201—manual driving mode), the determining unit 232 determines whether or not the sounds outside the vehicle 10 include warning sounds that should be heard by the driver 40 while driving the vehicle 10 (step S204). Examples of warning sounds include emergency vehicle siren sounds, horn sounds of other vehicles and railroad crossing alarm sounds. In some embodiments, when emergency vehicle siren sounds, horn sounds of other vehicles and railroad crossing alarm sounds can be heard, it is desirable for the driver 40 to drive the vehicle 10 while paying particular attention to the surroundings of the vehicle 10. The determining unit 232 is an example of the second determining unit, while warning sounds are an example of predetermined sounds.

The determining unit 232 has a classifier trained to distinguish warning sounds. The classifier used may be, for example, a convolutional neural network (CNN) or a recurrent neural network (RNN) pre-trained so as to detect warning sounds from among sounds sampled and quantized at predetermined sampling frequencies. The determining unit 232 determines whether or not sounds outside the vehicle 10 include warning sounds, by sampling and quantizing the sounds input through the microphone 2 at predetermined sampling frequencies and inputting them into the classifier trained to classify warning sounds. The method of detecting warning sounds is not limited to using the classifier described above. Other publicly known technologies may also be used to detect the warning sounds.

When a warning sound is included (step S204—Yes), when in the second attenuation mode, the deciding unit 233 decides to further reduce the degree of attenuation for the second attenuation mode to below that in the first attenuation mode (step S206). When a warning sound is included among the sounds outside the vehicle 10, the deciding unit 233 decides to cause attenuation to reduce intrusive sounds more than when it has been determined that a warning sound is not included among the sounds outside the vehicle 10. The deciding unit 233 generates attenuation degree information representing the degree of attenuation for causing attenuation of the magnitude of intrusive sounds in the cabin 30, and notifies the sound control unit 231 of the attenuation degree information. For example, when a warning sound is included among the sounds outside the vehicle 10, the deciding unit 233 generates attenuation degree information so that intrusive sounds in the cabin 30 are attenuated to a magnitude of 70% to 95%. Incidentally, the deciding unit 233 may also prevent attenuation of intrusive sounds in the cabin 30 when a warning sound is included among the sounds outside the vehicle 10.

The deciding unit 233 then notifies the sound control unit 231 of the attenuation degree information (step S203), and the series of processing steps is complete.

The sound control unit 231 generates the suppression sound signal to cause attenuation of intrusive sounds in the cabin 30 (including the warning sound) based on a sound electrical signal input through the microphone 2, and the attenuation degree information.

Based on the suppression sound signal, the speaker 3 then outputs the suppression sound which causes attenuation of the intrusive sounds in the cabin 30 that include the warning sound. When a warning sound is included among the sounds outside the vehicle 10, the intrusive sounds in the cabin 30 are attenuated to a magnitude of 70% to 95% or are not attenuated, and therefore the driver 40 is allowed to sufficiently hear the external sounds so as to be made more aware of the surrounding environment of the vehicle 10.

The driver 40 can thus sufficiently hear warning sounds such as emergency vehicle siren sounds, horn sounds of other vehicles and railroad crossing alarm sounds, so as to be fully aware of the surrounding environment of the vehicle 10. In manual driving mode, the driver 40 properly recognizes the surrounding environment of the vehicle, allowing the vehicle 10 to be driven appropriately.

When a predetermined warning sound is not included among the sounds outside the vehicle 10 (step S204—No), on the other hand, in the second attenuation mode, the deciding unit 233 decides to cause larger attenuation than when a warning sound is included (step S205). The deciding unit 233 generates attenuation degree information representing the degree of attenuation for causing attenuation of the magnitude of intrusive sounds in the cabin 30 in the second attenuation mode, and notifies the sound control unit 231 of the attenuation degree information. Specifically, the deciding unit 233 generates attenuation degree information so that intrusive sounds in the cabin 30 are attenuated to a magnitude of 50% to 90%.

The deciding unit 233 then notifies the sound control unit 231 of the attenuation degree information (step S203), and the series of processing steps is complete.

The sound control device, the computer program for sound control and the sound control method according to the embodiments described above may incorporate appropriate modifications that are still within the gist of the disclosure. Moreover, the technical scope of the disclosure is not limited to these embodiments, and includes the present disclosure and its equivalents as laid out in the Claims.

For example, in self-driving mode, the sound control device may notify the automatic control device of a request to reduce the speed of the vehicle when an emergency vehicle siren sound has been identified. The automatic control device 11 inputs the notification and reduces the speed of the vehicle 10. The automatic control device 11 may also drive the vehicle so that it stops along the shoulder, when an emergency vehicle has been detected.

The sound control device may also notify the automatic control device of a transfer request to transfer from self-driving mode to manual driving mode, when an alarm sound of another vehicle has been detected. Since it cannot be determined what situation another vehicle is in simply based on the alarm sound of the vehicle, the judgment for driving may be entrusted to the driver in manual driving mode.

The invention claimed is:

1. A sound control device comprising:
a processor configured to
determine whether a driving mode of a vehicle is a first driving mode wherein degree to which a driver participates in driving is low or a second driving mode wherein the degree to which the driver participates in driving is higher than the first driving mode, and
decide to cause attenuation of predetermined sounds inside the vehicle in a first attenuation mode, using a sound control unit which generates a suppression sound signal for output of suppression sound to cause attenuation of the predetermined sounds including sounds that have intruded into the vehicle from outside the vehicle, when it has been determined that the driving mode of the vehicle is the first driving mode, or to decide to cause attenuation of the predetermined sounds inside the vehicle in a second attenuation mode which has a smaller degree of attenuation than the first attenuation mode, using the sound control unit, when it has been determined that the driving mode of the vehicle is the second driving mode.

2. The sound control device according to claim 1, wherein the processor is further configured to
determine whether or not sounds outside the vehicle include the predetermined sounds that should be heard while the driver is driving the vehicle, and
decide to further reduce the degree of attenuation in the second attenuation mode to below that in the first attenuation mode, when it has been determined that the driving mode of the vehicle is the second driving mode and it has been determined that the sounds outside the vehicle include the predetermined sounds.

3. The sound control device according to claim 2, wherein the predetermined sounds have emergency vehicle siren sounds, horn sounds of other vehicle or railroad crossing alarm sounds.

4. A computer-readable, non-transitory storage medium storing a computer program for sound control, which causes a processor to execute a process, the process comprising:
   determining whether a driving mode of a vehicle is a first driving mode wherein degree to which a driver participates in driving is low or a second driving mode wherein the degree to which the driver participates in driving is higher than the first driving mode; and
   deciding to cause attenuation of predetermined sounds inside the vehicle in a first attenuation mode, using a sound control unit which generates a suppression sound signal for output of suppression sound to cause attenuation of the predetermined sounds including sounds that have intruded into the vehicle from outside the vehicle, when it has been determined that the driving mode of the vehicle is the first driving mode, or deciding to cause attenuation of the predetermined sound inside the vehicle in a second attenuation mode which has a smaller degree of attenuation than the first attenuation mode, when it has been determined that the driving mode of the vehicle is the second driving mode.

5. A sound control method carried out by a sound control device and the method comprising:
   determining whether a driving mode of a vehicle is a first driving mode wherein degree to which a driver participates in driving is low or a second driving mode wherein the degree to which the driver participates in driving is higher than the first driving mode; and
   deciding to cause attenuation of predetermined sounds inside the vehicle in a first attenuation mode, using a sound control unit which generates a suppression sound signal for output of suppression sound to cause attenuation of the predetermined sounds including sounds that have intruded into the vehicle from outside the vehicle, when it has been determined that the driving mode of the vehicle is the first driving mode, or deciding to cause attenuation of the predetermined sound inside the vehicle in a second attenuation mode which has a smaller degree of attenuation than the first attenuation mode, when it has been determined that the driving mode of the vehicle is the second driving mode.

* * * * *